US010340062B2

(12) United States Patent
Endo et al.

(10) Patent No.: US 10,340,062 B2
(45) Date of Patent: Jul. 2, 2019

(54) ELECTRIC WIRE BUNDLE, APPARATUS FOR MANUFACTURING ELECTRIC WIRE BUNDLE, AND METHOD FOR MANUFACTURING ELECTRIC WIRE BUNDLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Endo, Mie (JP); Shigeto Kato, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/559,585

(22) PCT Filed: Mar. 16, 2016

(86) PCT No.: PCT/JP2016/058240
§ 371 (c)(1),
(2) Date: Sep. 19, 2017

(87) PCT Pub. No.: WO2016/158399
PCT Pub. Date: Oct. 6, 2016

(65) Prior Publication Data
US 2018/0047482 A1    Feb. 15, 2018

(30) Foreign Application Priority Data

Mar. 27, 2015 (JP) ................. 2015-066203

(51) Int. Cl.
*H01B 7/00* (2006.01)
*H01B 13/012* (2006.01)
(Continued)

(52) U.S. Cl.
CPC ......... *H01B 13/012* (2013.01); *B65B 27/105* (2013.01); *H01B 7/282* (2013.01);
(Continued)

(58) Field of Classification Search
CPC . H01B 7/00; H01B 7/40; H01B 7/282; H01B 7/36; H01B 13/26; H01B 13/01263;
(Continued)

(56) References Cited

U.S. PATENT DOCUMENTS 6,051,789 A * 4/2000 Kato ................. H02G 3/0468
174/68.3
6,071,446 A * 6/2000 O'Brien ........... H01B 13/01263
264/261
(Continued)

FOREIGN PATENT DOCUMENTS

JP    49-007797    1/1974
JP    04-210182    7/1992
(Continued)

OTHER PUBLICATIONS

Search Report issued in International Bureau of WIPO Patent Application No. PCT/JP2016/058240, dated Jun. 7, 2016.

*Primary Examiner* — Angel R Estrada
(74) *Attorney, Agent, or Firm* — Greenblum & Bernstein, P.L.C.

(57) ABSTRACT

An object of the present invention is to make it easy to bind a plurality of electric wires together. An electric wire bundle includes an electric wire group and a binding portion. The electric wire group includes a bundle portion in which at least a portion of a plurality of electric wires in an extension
(Continued)

direction is bundled together. The binding portion formed by supplying a fluid binding portion forming material to an outer circumferential portion of the bundle portion in strip-shape in a form in which the bundle portion can be maintained in a bundled state and curing the binding portion forming material. Such a bundle can be formed by discharging the fluid binding portion forming material from a nozzle to the circumference of a bundle portion of a plurality of electric wires supported by an electric wire supporting portion, and curing the fluid binding portion forming material.

13 Claims, 9 Drawing Sheets

(51) Int. Cl.
*H01B 13/26* (2006.01)
*B65B 27/10* (2006.01)
*H01B 7/282* (2006.01)
*H01B 7/36* (2006.01)
*H02G 3/30* (2006.01)
*H02G 3/04* (2006.01)

(52) U.S. Cl.
CPC .......... *H01B 7/36* (2013.01); *H01B 13/01263* (2013.01); *H01B 13/26* (2013.01); *H02G 3/0462* (2013.01); *H02G 3/30* (2013.01); *B32B 2457/04* (2013.01)

(58) Field of Classification Search
CPC .......... H01B 13/012; H02G 3/30; H02G 3/32; H02G 3/36; B65B 27/105; B32B 2457/04
USPC ...... 174/135, 40 CC, 68.1, 68.3, 72 A, 72 R; 248/68.1, 49
See application file for complete search history.

(56) References Cited

U.S. PATENT DOCUMENTS

| 6,096,975 | A  | * | 8/2000 | Streit ................... | H02G 3/0468 |
| | | | | | 174/68.3 |
| 7,500,644 | B2 | * | 3/2009 | Naudet .................... | H02G 3/32 |
| | | | | | 174/68.1 |
| 7,687,721 | B2 | * | 3/2010 | Lietz ........................ | H01B 7/40 |
| | | | | | 174/117 F |
| 9,679,679 | B2 | * | 6/2017 | Wakabayashi ....... | H01B 7/0045 |
| 10,003,177 | B2 | * | 6/2018 | Nakashima ............ | H01B 7/282 |

FOREIGN PATENT DOCUMENTS

| JP | 06-005031 | 1/1994 |
| JP | 2008-117616 | 5/2008 |
| JP | 2011-100687 | 5/2011 |
| JP | 2014-032840 | 2/2014 |

* cited by examiner

ELECTRIC WIRE BUNDLE, APPARATUS FOR MANUFACTURING ELECTRIC WIRE BUNDLE, AND METHOD FOR MANUFACTURING ELECTRIC WIRE BUNDLE

TECHNICAL FIELD

The present invention relates to a technique for binding a plurality of electric wires together.

BACKGROUND ART

Patent Document 1 discloses that a plurality of electric wires to be included in a wire harness are bound together by wrapping an adhesive tape therearound, wrapping a resin sheet therearound, attaching a corrugated tube thereto, or the like.

CITATION LIST

Patent Documents

Patent Document 1: JP 2014-32840A

SUMMARY OF INVENTION

Technical Problem

However, in order to bind a plurality of electric wires together using a roll of adhesive tape, it is necessary that, after one end of the adhesive tape is adhered around the plurality of electric wires, the adhesive tape is rotated around the plurality of electric wires, and then the thus wrapped adhesive tape is cut off from the roll of adhesive tape.

In order to bind a plurality of electric wires together by wrapping a resin sheet therearound, it is necessary that a resin sheet is wrapped around the plurality of electric wires, and then bonding of the edge of the resin sheet, wrapping of an adhesive tape, or the like is performed separately.

In order to bind a plurality of electric wires together by attaching a corrugated tube thereto, it is necessary that the plurality of electric wires are accommodated in the corrugated tube through a slit formed in the corrugated tube, and then an adhesive tape is wrapped therearound in order to preventing the slit from opening.

As described above, in any of those cases, the operation for binding a plurality of electric wires together is troublesome.

Therefore, it is an object of the present invention to make it easy to bind a plurality of electric wires together.

Solution to Problem

To solve the foregoing problems, an electric wire bundle according to the first aspect includes an electric wire group including a bundle portion in which at least a portion of a plurality of electric wires in an extension direction is bundled together, and a binding portion formed by supplying a fluid binding portion forming material from a nozzle that is rotated relatively around an outer circumference of the bundle portion to an outer circumferential portion of the bundle portion in strip-shape in a form in which the bundle portion can be maintained in a bundled state, and curing the binding portion forming material.

The second aspect is the electric wire bundle according to the first aspect, wherein the binding portion is formed in a mesh-like shape.

The third aspect is the electric wire bundle according to the first or second aspect, wherein the binding portion has such rigidity that a route of the bundle portion can be maintained uniformly.

The fourth aspect is an apparatus for manufacturing an electric wire bundle including a bundle portion in which at least a portion of a plurality of electric wires in an extension direction is bundled together, the bundle portion being maintained in a bundled state, the apparatus including an electric wire supporting portion for supporting the plurality of electric wires in a state in which the bundle portion is raised, at least one nozzle that can discharge a fluid binding portion forming material, and a movement mechanism portion for moving at least one of the electric wire supporting portion and the at least one nozzle such that the at least one nozzle is rotated relatively around an outer circumference of the bundle portion, and the fluid binding portion forming material discharged from the at least one nozzle is supplied to an outer circumferential portion of the bundle portion in strip-shape in a form in which the bundle portion can be maintained in a bundled state as a whole.

The fifth aspect is the apparatus for manufacturing an electric wire bundle according to the fourth aspect, wherein the movement mechanism portion includes a circumferential direction movement mechanism portion for moving at least one of the electric wire supporting portion and the at least one nozzle such that the at least one nozzle is moved relatively around the bundle portion, and a route direction movement mechanism portion for moving at least one of the electric wire supporting portion and the at least one nozzle such that the at least one nozzle is moved relatively along a planned bundle portion formation route.

The sixth aspect is the apparatus for manufacturing an electric wire bundle according to the fifth aspect, wherein at least a portion of the planned bundle portion formation route is curved, and the route direction movement mechanism portion moves at least one of the electric wire supporting portion and the at least one nozzle such that the at least one nozzle is moved relatively while turning at at least one portion along the planned bundle portion formation route.

The seventh aspect is the apparatus for manufacturing an electric wire bundle according to the fifth or sixth aspect, wherein a condensing guide portion for condensing the bundle portion to a more tightened state is provided on a front side of the at least one nozzle in a direction in which the at least one nozzle is moved by the route direction movement mechanism portion.

The eighth aspect is the apparatus for manufacturing an electric wire bundle according to any one of the fifth to seventh aspects, wherein a curing accelerating portion for accelerating curing of the fluid binding portion forming material is provided on a rear side of the at least one nozzle in a direction in which the at least one nozzle is moved by the route direction movement mechanism portion.

The ninth aspect is the apparatus for manufacturing an electric wire bundle according to any one of the fourth to eighth aspects, wherein the at least one nozzle includes a plurality of nozzles provided at different positions in an extension direction of the bundle portion.

The tenth aspect is the apparatus for manufacturing an electric wire bundle according to any one of the fourth to ninth aspects, wherein the at least one nozzle includes a plurality of nozzles provided at different positions around the bundle portion.

The eleventh aspect is the apparatus for manufacturing an electric wire bundle according to the fourth aspect, wherein the at least one nozzle includes a plurality of first nozzles provided at different positions around the bundle portion, and a plurality of second nozzles provided at positions shifted relative to the plurality of first nozzles on the planned bundle portion formation route, the movement mechanism portion includes a circumferential direction movement mechanism portion for moving the plurality of first nozzles and the plurality of second nozzles together around the bundle portion, and a route direction movement mechanism portion for moving the plurality of first nozzles and the plurality of second nozzles along the planned bundle portion formation route, and the plurality of the first nozzles and the plurality of second nozzles are moved along the planned bundle portion formation route and moved periodically in both forward and reverse directions around the bundle portion such that the fluid binding portion forming material supplied from the plurality of first nozzles and the plurality of second nozzles form regular meandering strips in an extension direction of the bundle portion on an outer circumferential surface of the bundle portion and connect to one another on the outer circumferential surface of the bundle portion to form a mesh-like shape.

The twelfth aspect is a method for manufacturing an electric wire bundle including a bundle portion in which at least a portion of a plurality of electric wires in an extension direction is bundled together, the bundle portion being maintained in a bundled state, the method including (a) a step of preparing an electric wire group including a bundle portion in which at least a portion of a plurality of electric wires in an extension direction is bundled together, (b) a step of supplying a fluid binding portion forming material from a nozzle that is rotated relatively around an outer circumference of the bundle portion to an outer circumferential portion of the bundle portion in strip-shape in a form in which the bundle portion can be maintained in a bundled state, and (c) a step of curing the fluid binding portion forming material supplied to an outer circumferential surface of the bundle portion.

Advantageous Effects of Invention

With the first aspect, the binding portion can be formed by supplying the fluid binding portion forming material to the outer circumferential portion of the bundle portion in strip-shape in a form in which the bundle portion can be maintained in a bundled state and curing the binding portion forming material. The plurality of electric wires can be maintained in a bound state by this binding portion. Therefore, the plurality of electric wires can be bound together easily.

With the second aspect, the binding portion can be provided in a relatively wide range. This makes it possible to protect the bundle portion to some extent.

With the third aspect, the route of the bundle portion can be maintained uniformly by the binding portion.

With the fourth aspect, the fluid binding portion forming material can be supplied from the at least one nozzle to the outer circumferential portion of the bundle portion in strip-shape in a form in which the bundle portion can be maintained in a bundled state as a whole. The binding portion is formed by curing the binding portion forming material around the outer circumferential portion, and thus the bundle portion can be maintained in a bound state. Therefore, the plurality of electric wires can be bound together easily.

With the fifth aspect, the binding portion forming material can be supplied to the outer circumferential portion of the bundle portion while the at least one nozzle is moved relatively along the planned bundle portion formation route. This makes it possible to supply the binding portion forming material to a broader region of the bundle portion, thus making it possible to form the binding portion in the broader region. Therefore, the bundle portion can be more reliably maintained in a bound state by the binding portion formed in the broad region.

With the sixth aspect, the bundle portion can be maintained in a curved state by the binding portion.

With the seventh aspect, the binding portion forming material is supplied from the at least one discharging portion in a state in which the bundle portion is condensed to a more tightened state by the condensing guide portion, and therefore, the bundle portion can be bound together in a more tightened state.

With the eighth aspect, the binding portion forming material can be cured quickly.

With the ninth aspect, the binding portion forming material can be efficiently supplied in strip-shape at different positions in the extension direction of the bundle portion.

With the tenth aspect, the at least one nozzle includes a plurality of nozzles provided at different positions around the bundle portion, and therefore, the fluid binding portion forming material can be supplied to the entire circumference of the bundle portion without rotating the nozzles once around the bundle portion.

With the eleventh aspect, the fluid binding portion forming material supplied from the plurality of first nozzles and the plurality of second nozzles forms regular meandering strips on the outer circumferential surface of the bundle portion, and the meandering strips are joined to one another on the outer circumferential surface of the bundle portion. As a result, the mesh-like binding portion can be formed efficiently.

With the twelfth aspect, the binding portion can be formed by supplying the fluid binding portion forming material to the outer circumferential portion of the bundle portion in strip-shape in a form in which the bundle portion can be maintained in a bundled state and curing the binding portion forming material. The plurality of electric wires can be maintained in a bound state by this binding portion. Therefore, the plurality of electric wires can be bound together easily.

DESCRIPTION OF EMBODIMENTS

First Embodiment

Hereinafter, an electric wire bundle, an apparatus for manufacturing an electric wire bundle, and a method for manufacturing an electric wire bundle according to a first embodiment will be described.

Figure 1:
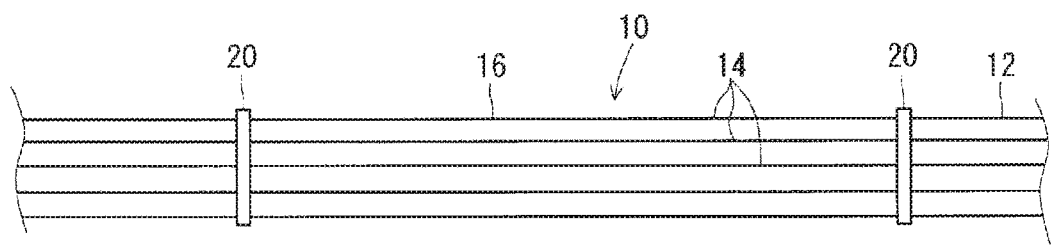
FIG. 1 is a schematic side view of an electric wire bundle according to a first embodiment.

FIG. 1 is a schematic side view of an electric wire bundle 10.

The electric wire bundle 10 includes an electric wire group 12 and binding portions 20.

The electric wire group 12 includes a plurality of electric wires 14, and a bundle portion 16 in which at least a portion of the plurality of electric wires 14 in the extension direction (i.e. the direction in which the wires extend) is bundled together. The plurality of electric wires 14 may be branched at the other portions. Terminals may be attached to the ends of the electric wires 14, and the terminals may be connected to connectors. Such an electric wire group 12 serves as a wire harness, and used as a wiring member for connecting various electric parts to one another in a vehicle. The electric wire group 12 may also include an optical fiber cable.

Each of the binding portions 20 is formed by supplying a fluid binding portion forming material to the outer circumferential portion of the bundle portion 16 in strip-shape in a form in which the bundle portion 16 can be maintained in a bundled state. A thermoplastic resin, a photocurable resin such as an ultraviolet-curable resin, a moisture-curable resin, or the like can be used as the fluid binding portion forming material. The fluid binding portion forming material is cured after being supplied to the binding portions 20. As a result, the binding portions 20 maintain the bundle portion 16 in a bundled state.

In FIG. 1, the binding portions 20 are formed in an annular shape that goes once around the bundle portion 16 while being in contact with the outer circumferential portion of the bundle portion 16. The binding portions 20 are provided at a plurality of positions (here, two positions) in the extension direction of the bundle portion 16. As a result, the bundle portion 16 is maintained in a bundled state.

Figure 2:
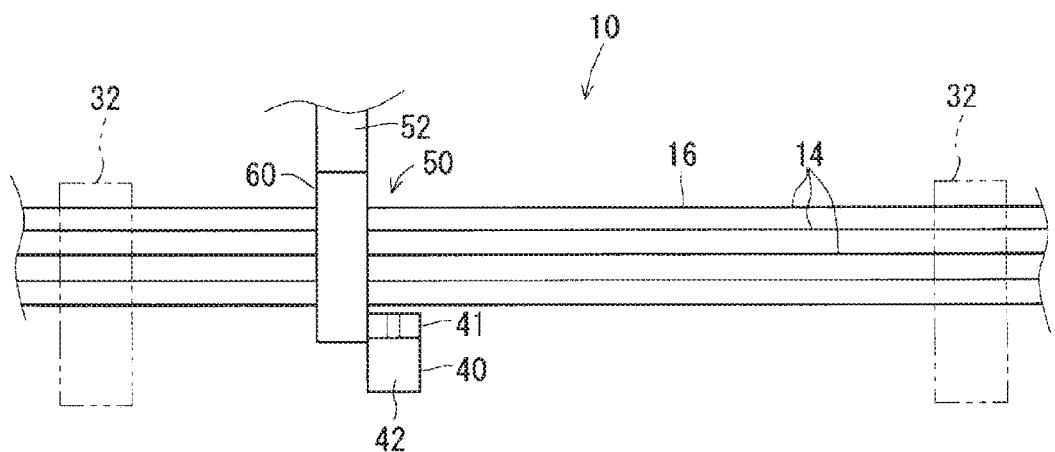
FIG. 2 is a schematic side view of an apparatus for manufacturing the electric wire bundle according to the first embodiment.
Figure 3:
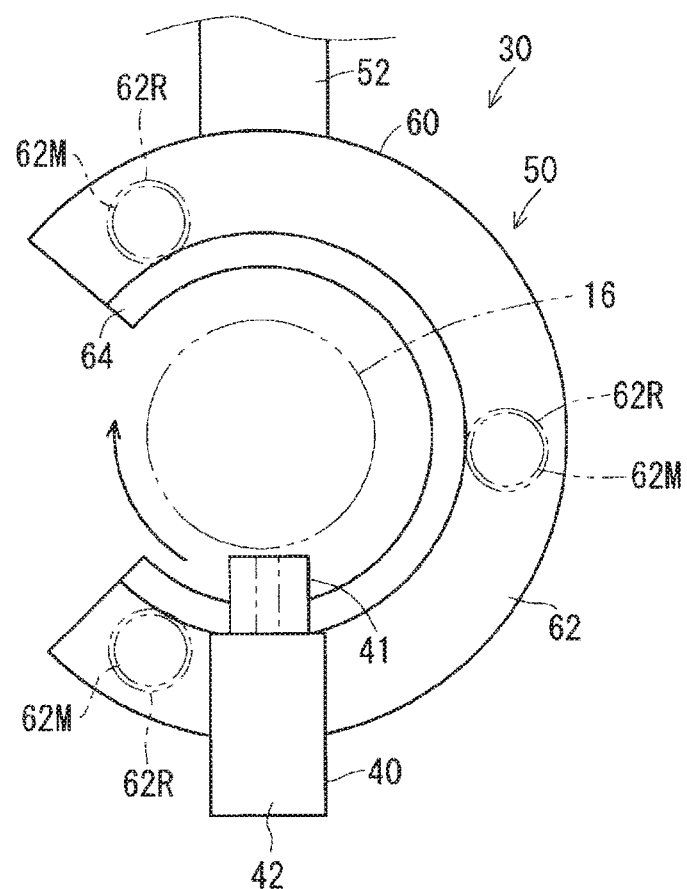
FIG. 3 is a schematic partial front view of the manufacturing apparatus shown in FIG. 2.

FIG. 2 is a schematic side view of an apparatus 30 for manufacturing an electric wire bundle, and FIG. 3 is a schematic partial front view of the manufacturing apparatus 30 shown in FIG. 2.

The apparatus 30 for manufacturing an electric wire bundle includes electric wire supporting portions 32, a discharging portion 40 including at least one nozzle 41, and a movement mechanism portion 50.

The electric wire supporting portions 32 can support the plurality of electric wires 14 in a state in which the bundle portion 16 is raised. The electric wire supporting portions 32 may have a configuration such as that of a clothespin in which the plurality of electric wires 14 in a bundled state can be supported using an elastic force of a spring, or a configuration in which the plurality of electric wires 14 in a bundled state can be supported using a fixing force of fixation by screws.

Here, two electric wire supporting portions 32 are provided at a certain interval on a predetermined worktable, and the two electric wire supporting portions 32 support the plurality of electric wires 14 at two positions located at a certain interval in the extension direction. As a result, the plurality of electric wires 14 are supported in a state in which the bundle portion 16 is raised while extending in a linear manner between the two electric wire supporting portions 32.

The discharging portion 40 can discharge the fluid binding portion forming material to the outer circumferential portion of the bundle portion 16. Here, the discharging portion 40 includes the single nozzle 41, and a reservoir portion 42 in which the fluid binding portion forming material is stored. Here, the entire discharging portion 40 is rotated around the bundle portion 16, and thus the fluid binding portion forming material is supplied to the circumference of the bundle portion 16. It will be appreciated that a configuration is also possible in which the reservoir portion is provided at another position and coupled to the nozzle via a bendable tube, and only the nozzle is rotated around the bundle portion.

The movement mechanism portion 50 moves the nozzle 41 around the bundle portion 16. Here, the movement mechanism portion 50 includes a circumferential direction movement mechanism portion 60 supported by a bracket 52.

The circumferential direction movement mechanism portion 60 moves the nozzle 41 around the bundle portion 16. More specifically, the circumferential direction movement mechanism portion 60 includes an outer annular portion 62 and an inner annular portion 64. Openings are formed at portions of the outer annular portion 62 and the inner annular portion 64 in the circumferential direction. The bend radius of the outer circumferential portion of the inner annular portion 64 is set to be substantially the same as the bend radius of the inner circumferential portion of the outer annular portion 62. The inner annular portion 64 is provided rotatably in the outer annular portion 62. In this state, in the outer annular portion 62, the inner annular portion 64 is rotatably supported by a plurality of guide rollers 62R provided on the outer annular portion 62 at certain intervals in the circumferential direction. At least two of the plurality of guide rollers 62R can be rotated by motors 62M in a synchronized manner. When the inner annular portion 64 is rotated, at least one of the plurality of guide rollers 62R comes into contact with the inner annular portion 64 and is rotated, and thus the inner annular portion 64 can be rotated once or more. In a state in which the opening of the inner annular portion 64 and the opening of the outer annular portion 62 are coincident, the bundle portion 16 can be passed through the openings and provided in the inner annular portion 64.

The above-mentioned discharging portion 40 is fixed to one end of the inner annular portion 64 and protrudes in the axis direction of the bundle portion 16. In this state, the nozzle 41 faces the center of the bundle portion 16, that is, the outer circumferential portion of the bundle portion 16. Then, the nozzle 41 can be rotated around the outer circumference of the bundle portion 16 by rotating the inner annular portion 64 around the bundle portion 16, which is located inside the inner annular portion 64.

It should be noted that the bundle portion 16 constituted by the electric wires 14 may also be rotated around its central axis instead of rotating the discharging portion 40.

The above-mentioned manufacturing apparatus 30 is used to manufacture the electric wire bundle 10 as described below.

First, the electric wire group 12 including the bundle portion 16 in which at least a portion of the plurality of electric wires 14 in the extension direction is bundled together is prepared. In this state, the binding portions 20 are not used to maintain the bundle portion 16 in a bundled state. The bundle portion 16 is temporarily maintained in a bundled state by hand by an operator. It should be noted that adhesive tapes, binding bands, or the like may also be used at portions on the front and rear sides of the bundle portion 16 to maintain the bundle portion 16 in a bundled state. The above-mentioned electric wire supporting portions 32 support this electric wire group 12. At this time, the bundle portion 16 is passed through the opening of the outer annular portion 62 and the opening of the inner annular portion 64 and arranged inside the inner annular portion 64.

Thereafter, the fluid binding portion forming material is supplied to the nozzle 41 from the reservoir portion 42, and the circumferential direction movement mechanism portion 60 is driven to rotate the nozzle 41 around the bundle portion 16 once or more with the fluid binding portion forming material being discharged from the nozzle 41. Then, the fluid binding portion forming material is supplied to the circumference of the bundle portion 16 so as to form an annular strip on the outer circumferential portion of the bundle portion 16 in a form in which the bundle portion 16 can be maintained in a bundled state as a whole.

Thereafter, the binding portion forming material is cured. That is, when the binding portion forming material in the fluid state is a thermoplastic resin, the binding portion forming material is subjected to self-cooling or forced cooling; when the binding portion forming material in the fluid state is a photocurable resin, the binding portion forming material is exposed to natural light or is irradiated with light for curing; and when the binding portion forming material in the fluid state is a moisture-curable resin, the binding portion forming material is exposed to moisture in air. As a result, the binding portion 20 that has been cured in an annular shape is formed around the bundle portion 16 to maintain the bundle portion 16 in a bundled state.

The binding portions 20 can be formed at a plurality of positions on the bundle portion 16 by changing the location of the bundle portion 16 as necessary and repeating the above-mentioned operations.

As a result, the binding portions 20 for the electric wires are manufactured.

With this embodiment, the fluid binding portion forming material is supplied to the outer circumferential portion of the bundle portion 16 in strip-shape in a form in which the bundle portion 16 can be supported in a bundled state. Here, the fluid binding portion forming material is supplied so as to form an annular strip around the bundle portion 16. The binding portion 20 is formed by curing this binding portion forming material, and thus the bundle portion 16 is maintained in a bound state. Therefore, the plurality of electric wires 14 can be bound together easily.

Modified Examples

Various modified examples based on the above-described first embodiment will be described.

Figure 4:
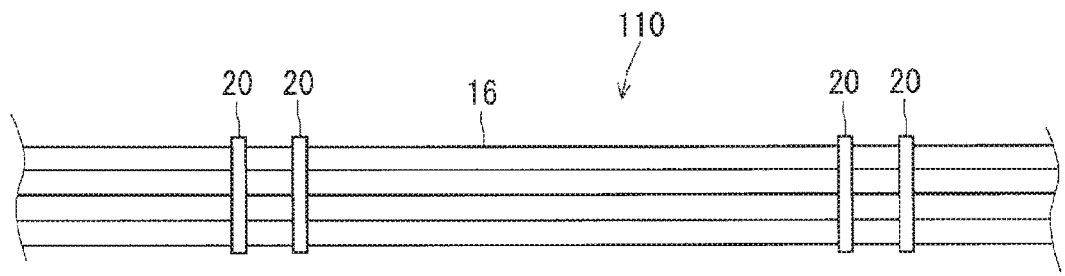
FIG. 4 is a schematic side view of an electric wire bundle according to a first modified example.

First, in a first modified example shown in FIG. 4, the binding portions 20 are formed in parallel on an electric wire bundle 110 that corresponds to the electric wire bundle 10. Here, two binding portions 20 are formed at two positions that are relatively close to each other, and two further binding portions 20 are formed at two positions separated from those two positions at a larger interval.

Figure 5:
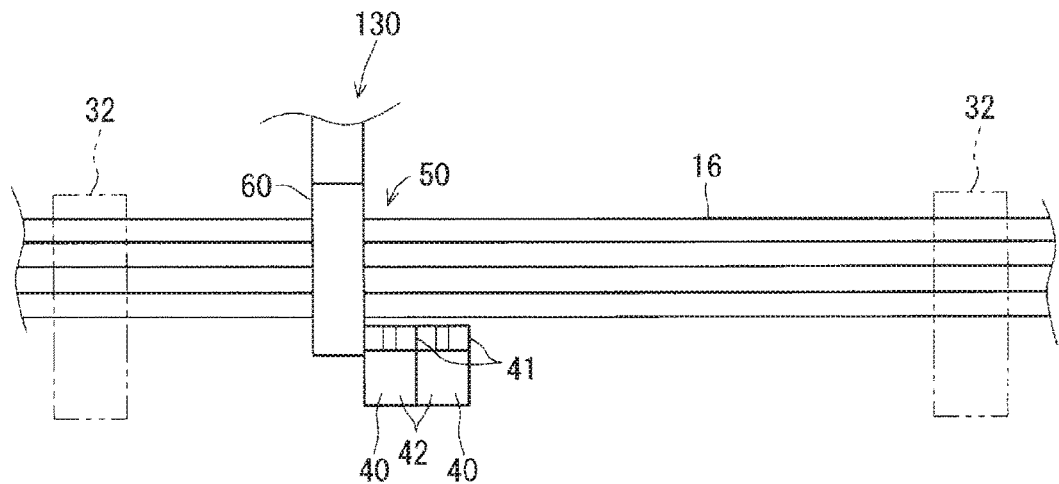
FIG. 5 is a schematic side view of an apparatus for manufacturing the electric wire bundle according to the first modified example.

This electric wire bundle 110 can be efficiently manufactured using a manufacturing apparatus 130 shown in FIG. 5, for example.

This manufacturing apparatus 130 is based on the above-mentioned manufacturing apparatus 30 and includes a plurality of (here, two) nozzles 41 provided at different positions in the extension direction of the bundle portion 16. Here, one discharging portion 40 is attached to the inner annular portion 64, and another discharging portion 40 is attached adjacent thereto.

As a result, the binding portion forming material can be efficiently supplied to different positions in the extension direction of the bundle portion 16, so that a plurality of (here, two) binding portions 20 can be formed efficiently.

Figure 6:
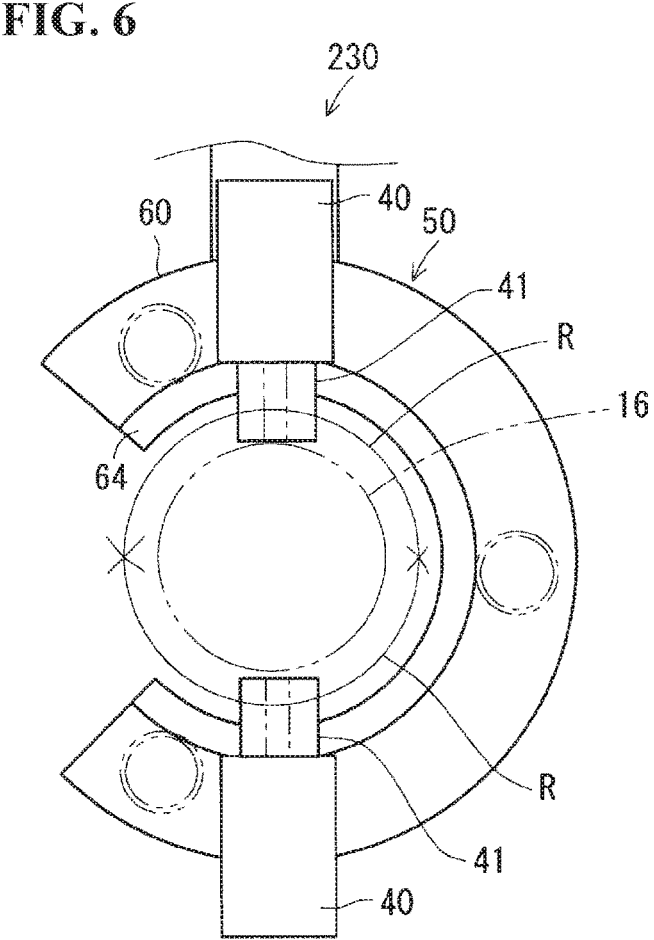
FIG. 6 is a schematic partial front view of an electric wire bundle according to a second modified example.

A manufacturing apparatus 230 according to a second modified example shown in FIG. 6 is based on the above-mentioned manufacturing apparatus 30, and includes a plurality of (here, two) nozzles 41 that are provided at different positions around the bundle portion 16. Here, two discharging portions 40 are attached to positions that face each other with the central axis of the inner annular portion 64 being located therebetween.

With this manufacturing apparatus 230, the binding portions 20 having an annular shape can be formed by rotating the nozzles 41 within a rotation range R of 180 degrees. That is, the fluid binding portion forming material can be supplied to the entire circumference of the bundle portion 16 without rotating the nozzles 41 once around the bundle portion 16. As a result, the binding portions 20 can be formed quickly.

When the nozzles and the reservoir portion are connected via bendable tubes (see second embodiment), the rotation angles of the nozzles can be reduced, thus making it possible to advantageously suppress a case where the tubes are accidentally wound around the bundle portion 16.

Figure 7:
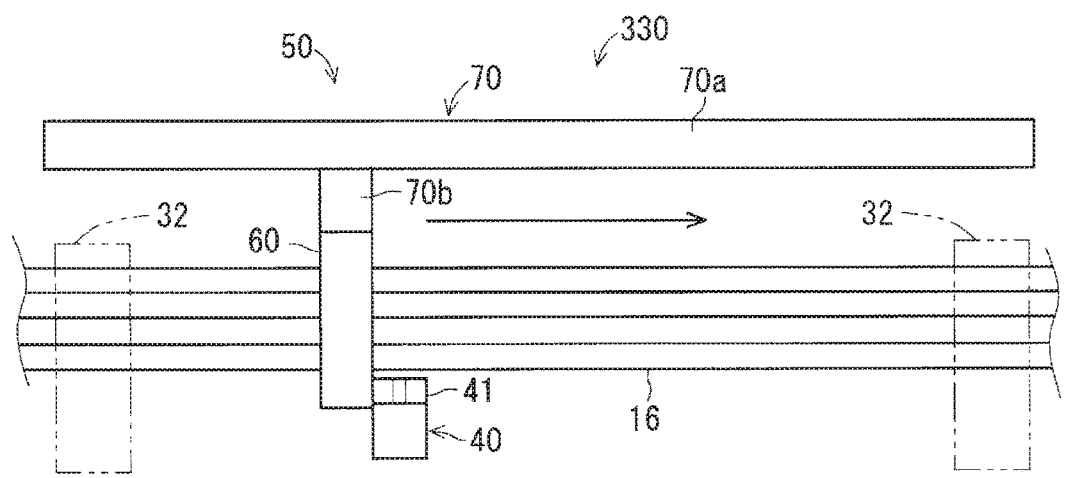
FIG. 7 is a schematic side view of an apparatus for manufacturing an electric wire bundle according to a third modified example.

A manufacturing apparatus 330 according to a third modified example shown in FIG. 7 is based on the above-mentioned manufacturing apparatus 30, and the movement mechanism portion 50 includes a route direction movement mechanism portion 70 for moving the nozzle 41 along the bundle portion 16 (planned bundle portion formation route).

Here, the circumferential direction movement mechanism portion 60 that supports the discharging portion 40 is supported by the route direction movement mechanism portion 70 so as to be capable of moving in the extension direction of the bundle portion 16.

The route direction movement mechanism portion 70 is a linear actuator such as a linear motor or an air cylinder, and includes a driving main body portion 70a that is provided extending in the extension direction of the bundle portion 16, and a movable portion 70b that is supported by the driving main body portion 70a so as to be capable of moving in the extension direction of the bundle portion 16. The above-mentioned circumferential direction movement mechanism portion 60 is supported by the movable portion 70b so as to be capable of moving.

Figure 8:
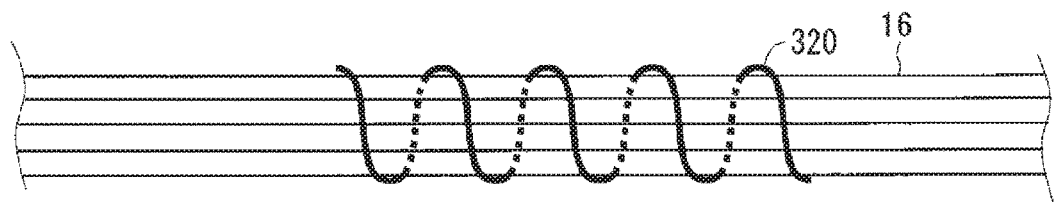
FIG. 8 is a schematic side view of the electric wire bundle according to the third modified example.

While discharging the binding portion forming material, the nozzle 41 is rotated around the bundle portion 16 by the circumferential direction movement mechanism portion 60, and moved in the extension direction of the bundle portion 16. As a result, the binding portion forming material is supplied in a spiral manner around the bundle portion 16. When this binding portion forming material is cured, a spiral-shaped binding portion 320 is formed on the bundle portion 16 as shown in FIG. 8. This makes it possible to supply the binding portion forming material to a broader region of the bundle portion 16, thus making it possible to form the binding portion 320 in the broader region. As a result, more reliable binding can be achieved.

Figure 9:
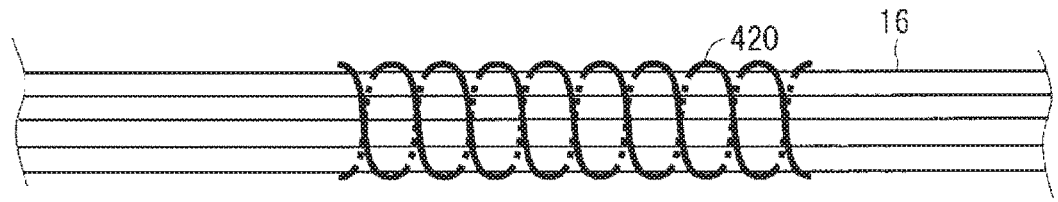
FIG. 9 is a schematic side view of another electric wire bundle according to the third modified example.

Moreover, the bundle portion 16 can also be protected using the binding portion 320 formed in the broader region. In particular, when the pitch of the spiral of the above-mentioned binding portion 320 is reduced, or a binding portion 420 is formed by forming a plurality of spirals using a plurality of nozzles provided at different positions in the extension direction or circumferential direction of the bundle portion 16 as shown in FIG. 9, a denser binding portion can be formed, which is suitable for protecting the bundle portion 16. In particular, when the binding portion forming material is supplied to the outer circumferential portion of the bundle portion 16 in a mesh-like manner in the same manner as in a second embodiment, which will be described subsequently, the bundle portion 16 can be protected more reliably.

If a binding portion forming material is used that exerts such rigidity that the route of the bundle portion 16 can be maintained after being cured, the route of the bundle portion 16 can be maintained. It should be noted that it is preferable to increase the thickness of the binding portion forming material on the outer circumferential portion of the bundle portion 16 and the density thereof as much as possible in order to maintain the route of the bundle portion 16. It should be noted that the thickness of the strip portion making up the binding portion 20 can be adjusted by adjusting the discharge amount from the nozzle 41.

It should be noted that, in these modified examples, the bundle portion 16 may also be moved in its extension direction instead of moving the nozzle 41 in the extension direction of the bundle portion 16.

Second Embodiment

An electric wire bundle, an apparatus for manufacturing an electric wire bundle, and a method for manufacturing an electric wire bundle according to a second embodiment will be described next.

Figure 10:
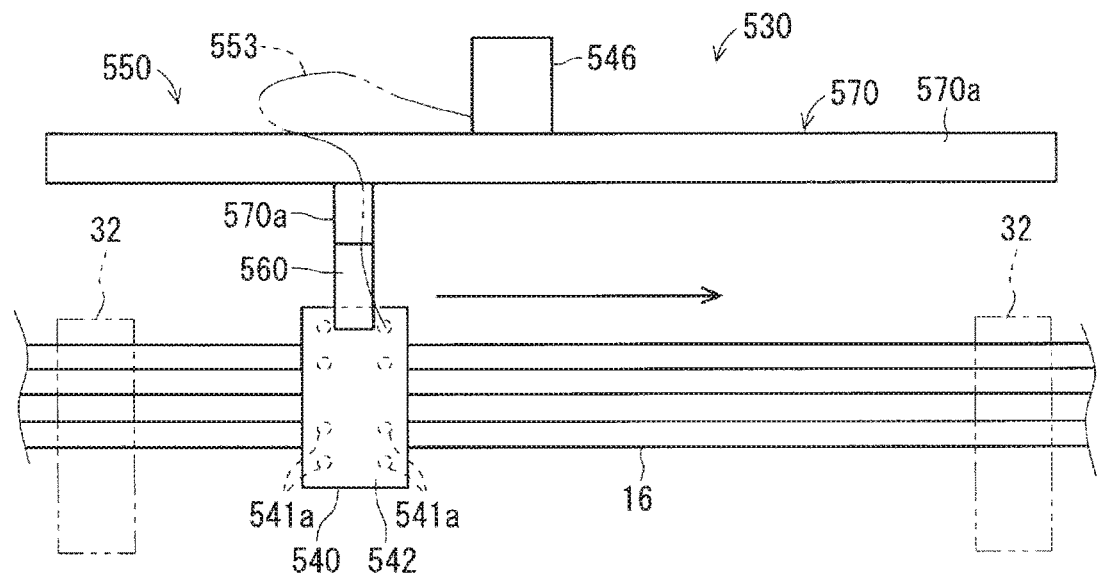
FIG. 10 is a schematic side view of an apparatus for manufacturing an electric wire bundle according to a second embodiment.
Figure 11:
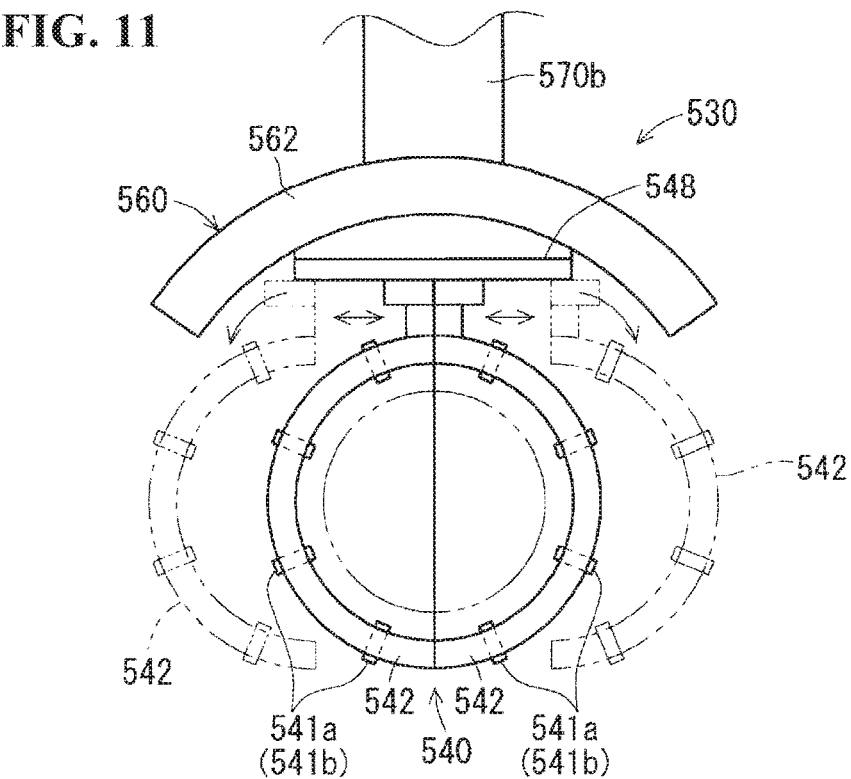
FIG. 11 is a schematic partial front view of the manufacturing apparatus shown in FIG. 10.

FIG. 10 is a schematic side view of an apparatus 530 for manufacturing an electric wire bundle, and FIG. 11 is a schematic partial front view of the manufacturing apparatus 530 shown in FIG. 10.

The apparatus 530 for manufacturing an electric wire bundle includes an electric wire supporting portion 32, a discharging portion 540 including at least one of nozzles 541a and 541b, and a movement mechanism portion 550.

The electric wire supporting portion 32 is the same as that of the first embodiment described above.

The discharging portion 540 can discharge the fluid binding portion forming material to the outer circumferential portion of the bundle portion 16.

Here, the discharging portion 540 includes a pair of semi-annular portions 542 and a reservoir portion 546.

When being united, the pair of semi-annular portions 542 has an annular shape with such a size that the semi-annular portions 542 can surround the bundle portion 16.

The pair of semi-annular portions 542 includes a plurality of first nozzles 541a provided at different positions around the bundle portion 16, and a plurality of second nozzles 541b provided at positions adjacent to the plurality of first nozzles 541a in the extension direction of the bundle portion 16 (i.e., along the planned bundle portion formation route).

The plurality of first nozzles 541a are attached to the pair of semi-annular portions 542 with their discharge ports facing inward. Here, four first nozzles 541a are attached to each of the pair of semi-annular portions 542. The nozzles 541a are provided at 45-degree intervals (360 degrees/(the total number of nozzles, eight)) around the bundle portion 16 as a center. As a result, the fluid binding portion forming material can be supplied to the entire outer circumference of the bundle portion 16 by rotating the discharging portion 40 within a range of about 45 degrees.

The plurality of second nozzles 541b are provided at positions shifted relative to the above-mentioned plurality of first nozzles 541a in the extension direction of the bundle portion 16 (along the planned bundle portion formation route), and, here, the second nozzles 541b are provided at adjacent positions.

Moreover, bendable tubes 553 are coupled to the nozzles 541a and 541b on the outer circumferential side of the semi-annular portions 542 (FIG. 10 schematically shows only one bendable tube 553). The tubes 553 are coupled to the reservoir portion 546 that is provided separately and used to supply a material. The fluid binding portion forming material is supplied to the nozzles 541a and 541b from the reservoir portion 546 via the tubes 553, and is then discharged from the nozzles 541a and 541b.

It should be noted that one common temporary reservoir space may be formed in the semi-annular portion, and a single tube as well as the plurality of nozzles provided in the semi-annular portion may be coupled to the temporary reservoir space. As a result, after the fluid binding portion forming material supplied through the single tube flows into the temporary reservoir space, the binding portion forming material is divided into a plurality of portions and supplied from the nozzles. Therefore, the number of tubes can be reduced.

The above-mentioned pair of semi-annular portions 542 is supported by an opening/closing driving portion 548 so as to be capable of being opened/closed. The opening/closing driving portion 548 includes an electromagnetic actuator or the like, and is driven to close the pair of semi-annular portions 542 into a state in which they form one ring and to open the pair of semi-annular portions 542 into a state (shown by long-short-short dashed lines in FIG. 11) in which the bundle portion 16 can be provided therebetween. In the state in which the pair of semi-annular portions 542 is closed, the fluid binding portion forming material can be supplied from the nozzles 541a and 541b, and in the state in which the pair of semi-annular portions 542 are open, the bundle portion 16 can be brought to or removed from therebetween.

The movement mechanism portion 550 includes a circumferential direction movement mechanism portion 560 that moves the plurality of first nozzles 541a and the plurality of second nozzles 541b together around the bundle portion 16, and a route direction movement mechanism portion 570 that moves the plurality of first nozzles 541a and the plurality of second nozzles 541b in the extension direction of the bundle portion 16 (along the planned bundle portion formation route).

The circumferential direction movement mechanism portion 560 includes an arc-shaped guide member 562 having an arc shape around the central axis of the bundle portion 16, and the discharging portion 540 is supported by the arc-shaped guide member 562 via the opening/closing driving portion 548 so as to be capable of moving around the central axis of the bundle portion 16. A driving gear that meshes with an arc-shaped gear provided in the opening/closing driving portion 548, and a driving portion including a motor for rotating the driving gear and the like are integrated into the circumferential direction movement mechanism portion 560. With this drive, the opening/closing driving portion 548 and the discharging portion 540 can be rotated by about 45 degrees around the central axis of the bundle portion 16.

The route direction movement mechanism portion 570 is a linear actuator such as a linear motor or an air cylinder, and includes a driving main body portion 570a that is provided extending in the extension direction of the bundle portion 16, and a movable portion 570b that is supported by the driving main body portion 570a so as to be capable of moving in the extension direction of the bundle portion 16. The above-mentioned circumferential direction movement mechanism portion 560 is supported by the movable portion 570b so as to be capable of moving.

While the binding portion forming material is discharged from the first nozzles 541a and the second nozzles 541b, the circumferential direction movement mechanism portion 560 is driven to periodically reciprocate the discharging portion 540 within a rotation range of 45 degrees around the central axis of the bundle portion 16 at a speed that is as constant as possible, and the route direction movement mechanism portion 570 is driven to move the discharging portion 540 in the extension direction of the bundle portion 16 at a constant speed. That is, the plurality of the first nozzles 541a and the plurality of second nozzles 541b are moved in the extension direction of the bundle portion 16 (along the planned bundle portion formation route) and moved periodically in both forward and reverse directions around the bundle portion 16 such that the fluid binding portion forming material supplied from the first nozzles 541a and the second nozzles 541b form regular meandering strips (here, triangular waves) in the extension direction of the bundle portion 16 on the outer circumferential surface of the bundle portion 16. At this time, the first nozzles 541a and the second nozzles 541b are moved such that the meandering strips connect to one another on the outer circumferential surface of the bundle portion 16 to form a mesh-like shape. Here, the speed of the first nozzles 541a and the second nozzles 541b moved by the circumferential direction movement mechanism portion 560, and the speed of the first nozzles 541a and the second nozzles 541b moved by the route direction movement mechanism portion 570 are adjusted such that the pitches of the first nozzles 541a and the second nozzles 541b in a direction extending in the extension direction of the bundle portion 16 (along the planned bundle portion formation route) correspond to the half cycle of the above-mentioned meandering strips.

Figure 12:
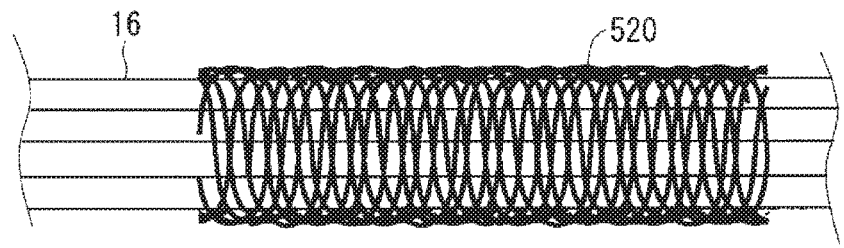
FIG. 12 is a schematic side view of the electric wire bundle of the second embodiment.

As a result, as shown in FIG. 12, the fluid binding portion forming material that has been supplied in strip-shape forms a mesh-like shape on the outer circumferential portion of the bundle portion 16.

Figure 13:
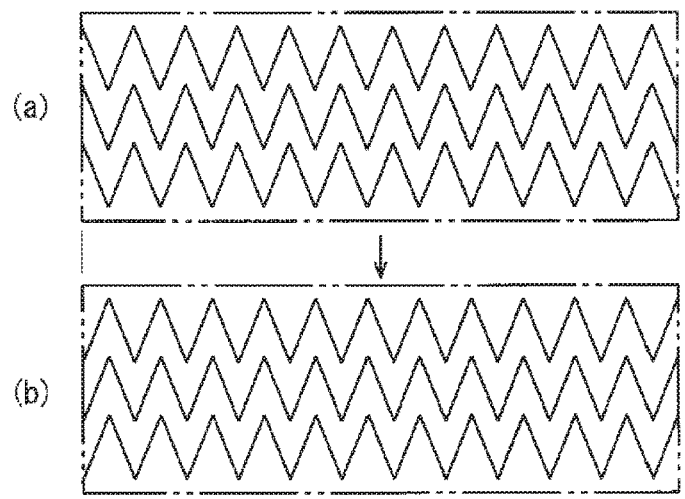
FIG. 13 shows explanatory diagrams showing the shape of a fluid binding portion forming material that has been discharged from nozzles.
Figure 14:
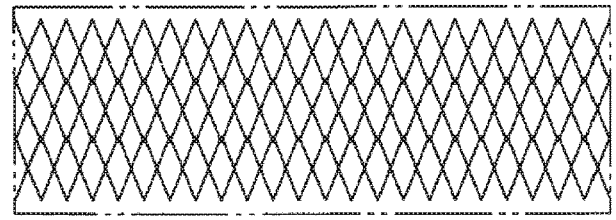
FIG. 14 is an explanatory diagram showing a mesh structure.

That is, when the fluid binding portion forming material supplied from the first nozzles 541a to the outer circumferential portion of the bundle portion 16 is shown on a face that is the outer circumferential surface of the bundle portion 16 developed in a planar manner, a plurality of triangular waves extending in parallel are formed as shown in FIG. 13(a). Moreover, when the fluid binding portion forming material supplied from the second nozzles 541b to the outer circumferential portion of the bundle portion 16 is shown on a face that is the outer circumferential surface of the bundle portion 16 developed in a planar manner in the same manner as mentioned above, a plurality of triangular waves extending in parallel are formed as shown in FIG. 13(b). Here, the triangular waves shown in FIG. 13(a) are shifted relative to the triangular waves shown in FIG. 13(b) by a half cycle, the apexes on the lower side (upper side) of the triangular waves shown in FIG. 13(a) and the apexes on the upper side (lower side) of the triangular waves shown in FIG. 13(b) are provided at the same positions on the outer circumferential portion of the bundle portion 16. Here, the fluid binding portion forming material keeps its fluid state immediately after being supplied to the outer circumferential portion of the bundle portion 16, and therefore, the above-mentioned apexes are joined to each other. As a result, the fluid binding portion forming material supplied from the first nozzles 541a and the second nozzles 541b to the outer circumferential portion of the bundle portion 16 forms a mesh-like shape on the outer circumferential portion of the bundle portion 16. Ideally, as shown in FIG. 14, a binding portion 520 is formed in a mesh-like shape including diamond-shaped meshes when being shown on a face that is the outer circumferential surface of the bundle portion 16 developed in a planar manner.

With this embodiment, the binding portion 520 can be formed in a mesh-like shape in a relatively wide range on the bundle portion 16, thus making it possible to protect the bundle portion 16.

It should be noted that the density of the mesh-like shape can be adjusted by changing the above-mentioned speed of movement by the route direction movement mechanism portion 570 and speed of swing by the circumferential direction movement mechanism portion 560.

If a binding portion forming material is used that exerts such rigidity that the route of the bundle portion 16 can be maintained after being cured, then the route of the bundle portion 16 can be maintained. It should be noted that it is preferable to increase the thickness of the binding portion forming material on the outer circumferential portion of the bundle portion 16 and the density thereof as much as possible in order to maintain the route of the bundle portion 16.

In particular, the above-mentioned apparatus 530 can be used to efficiently form the mesh-like binding portion 520.

It should be noted that, if the fluid binding portion forming material is supplied so as to form a spiral in a direction opposite to a spiral formed in a predetermined direction, then a mesh-like binding portion can be formed.

Modified Examples

Various modified examples based on the above-described second embodiment will be described.

Figure 15:
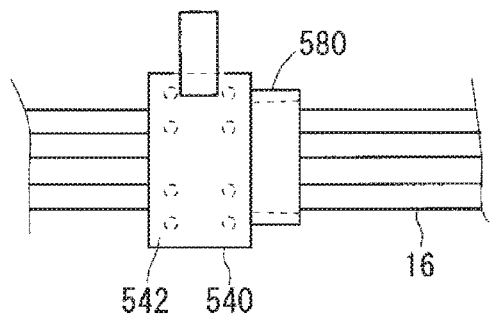
FIG. 15 is an explanatory diagram showing a discharging portion and a condensing guide portion according to a fourth modified example.
Figure 16:
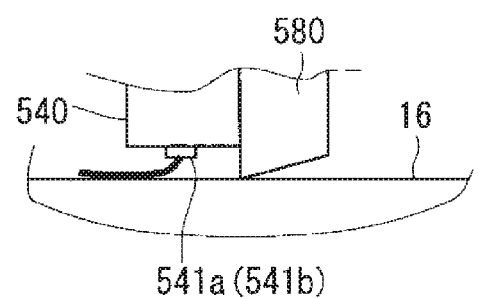
FIG. 16 is an explanatory diagram showing the discharging portion and the condensing guide portion according to the fourth modified example.

In a fourth modified example shown in FIGS. 15 and 16, a condensing guide portion 580 for condensing the bundle portion 16 to a more tightened state is provided on the front side of the discharging portion 540 in the direction of movement by the route direction movement mechanism portion 570. Here, the condensing guide portion 580 includes a combination of a pair of semi-annular members, and the pair of semi-annular members is supported by the pair of semi-annular portions 542. The pair of semi-annular members of the condensing guide portion 580 is also united into an annular shape in the state in which the pair of semi-annular portions 542 is united. It is preferable that, in the state in which the condensing guide portion 580 forms an annular shape, its minimum inner diameter is set to be smaller than the inner diameter of the annular shape formed by the pair of semi-annular portions 542. As a result, gaps are formed between the leading ends of the nozzles 541*a* and 541*b* and the outer circumferential surface of the bundle portion 16, and thus the fluid binding portion forming material can be supplied into these gaps.

The condensing guide portion 580 is formed in a tapered shape that gradually narrows toward the nozzles 541*a* and 541*b* in the extension direction of the bundle portion 16, and thus the bundle portion 16 is smoothly guided into a more tightened state.

With this modified example, the fluid binding portion forming material is supplied to the outer circumferential portion of the bundle portion 16 in a state in which the bundle portion 16 is condensed to a more tightened state, and therefore, the bundle portion 16 can be bound together in a more tightened state.

Figure 17:
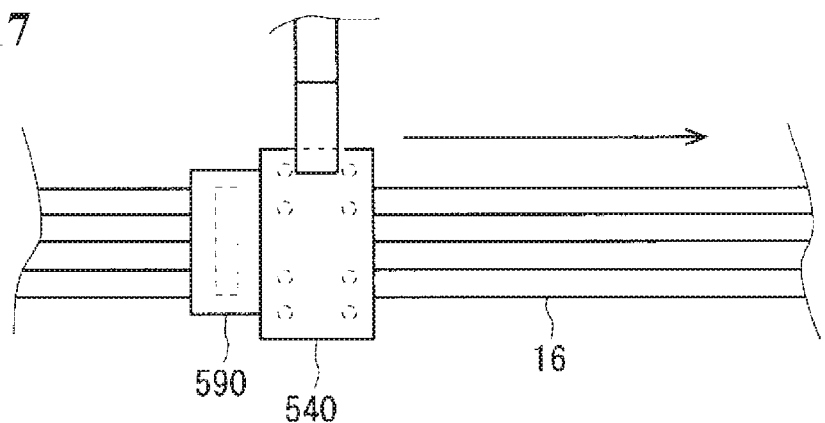
FIG. 17 is an explanatory diagram showing a discharging portion and a curing accelerating portion according to a fifth modified example.

In a fifth modified example shown in FIG. 17, a curing accelerating portion 590 for accelerating curing of the fluid binding portion forming material is provided on the rear side of the discharging portion 540 in the direction of movement by the route direction movement mechanism portion 570.

The curing accelerating portion 590 varies depending on the type of fluid binding portion forming material. When the binding portion forming material is a photocurable resin, for example, the curing accelerating portion 590 includes a light emitting portion 592 for emitting light toward the bundle portion 16. When the binding portion forming material is a thermoplastic resin, for example, the curing accelerating portion 590 includes a cooling portion for blowing air, or the like.

With this modified example, the binding portion forming material can be cured quickly, thus making it possible to efficiently manufacture the binding portion.

Figure 18:
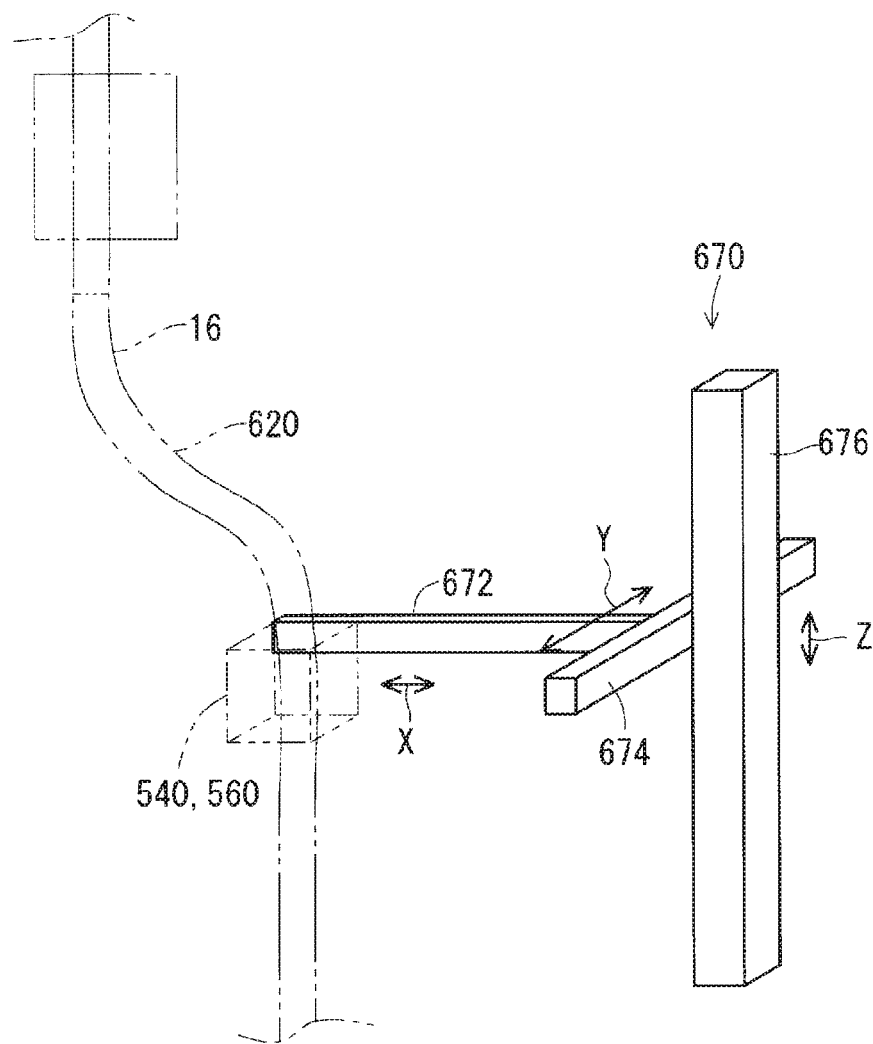
FIG. 18 is a schematic perspective view of an apparatus for manufacturing an electric wire bundle according to a sixth modified example.

In a sixth modified example shown in FIG. 18, a route direction movement mechanism portion 670 includes movement mechanism portions for moving the nozzles 541*a* and 541*b* in at least two directions. Here, the route direction movement mechanism portion 670 includes an X-direction movement mechanism portion 672, a Y-direction movement mechanism portion 674, and a Z-direction movement mechanism portion 676. It should be noted that, in addition, a robot arm having a large number of joints or the like may also be used as the route direction movement mechanism portion.

The X-direction movement mechanism portion 672, the Y-direction movement mechanism portion 674, and the Z-direction movement mechanism portion 676 each include a linear actuator such as a linear motor. The above-mentioned discharging portion 540 and the circumferential direction movement mechanism portion 560 are supported by the X-direction movement mechanism portion 672 so as to be capable of moving in the X direction, the X-direction movement mechanism portion 672 is supported by the Y-direction movement mechanism portion 674 so as to be capable of moving in the Y direction, which is orthogonal to the X direction, and the Y-direction movement mechanism portion 674 is supported by the Z-direction movement mechanism portion 676 so as to be capable of moving in the Z direction, which is orthogonal to the X direction and the Y direction.

As a result, the discharging portion 540 is supported so as to be capable of moving in the X, Y, and Z directions.

Figure 19:
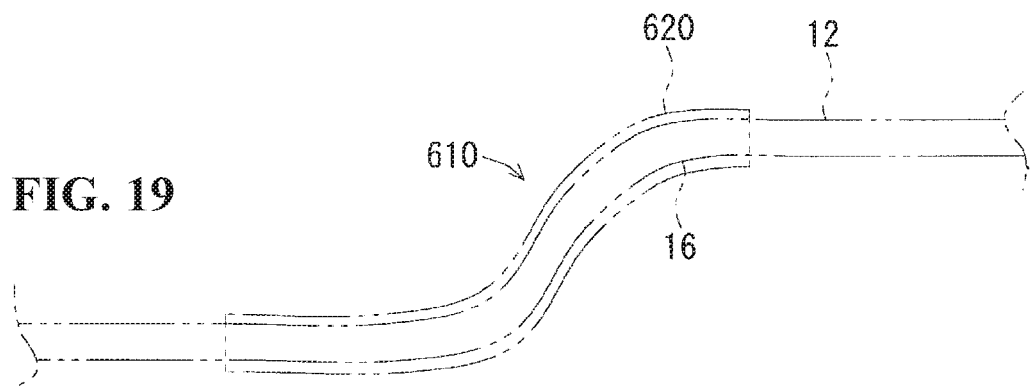
FIG. 19 is a schematic diagram of the electric wire bundle according to the sixth modified example.

The bundle portion 16 is inserted into the discharging portion 540 in a state in which one end of the electric wire group 12 is supported by the electric wire supporting portion 32, and then, in this state, the discharging portion 540 is moved along a predetermined planned bundle portion formation route using the route direction movement mechanism portion 670. Here, at least one portion of the planned bundle portion formation route is curved. The planned bundle portion formation route may be a route curved in a two-dimensional plane or a route curved in a three-dimensional manner. In either case, when the discharging portion 540 is moved along the curved planned bundle portion formation route using the route direction movement mechanism portion 670 with the fluid binding portion forming material being discharged from the nozzles 541*a* and 541*b*, the fluid binding portion forming material is supplied to the outer circumferential portion of the bundle portion 16 and then cured, so that the bundle portion 16 is maintained in a predetermined route shape. Subsequently, the discharging portion 540 is moved, and the fluid binding portion forming material is supplied to a next position of the bundle portion 16 and cured. These operations are performed successively, and thus the bundle portion 16 is maintained in a curved shape by a binding portion 620. As a result, an electric wire bundle 610 maintained by the binding portion 620 in a state in which the bundle portion 16 is curved as shown in FIG. 19.

It should be noted that the electric wire supporting portion 32 may also be moved instead of moving the discharging portion 540.

Figure 20:
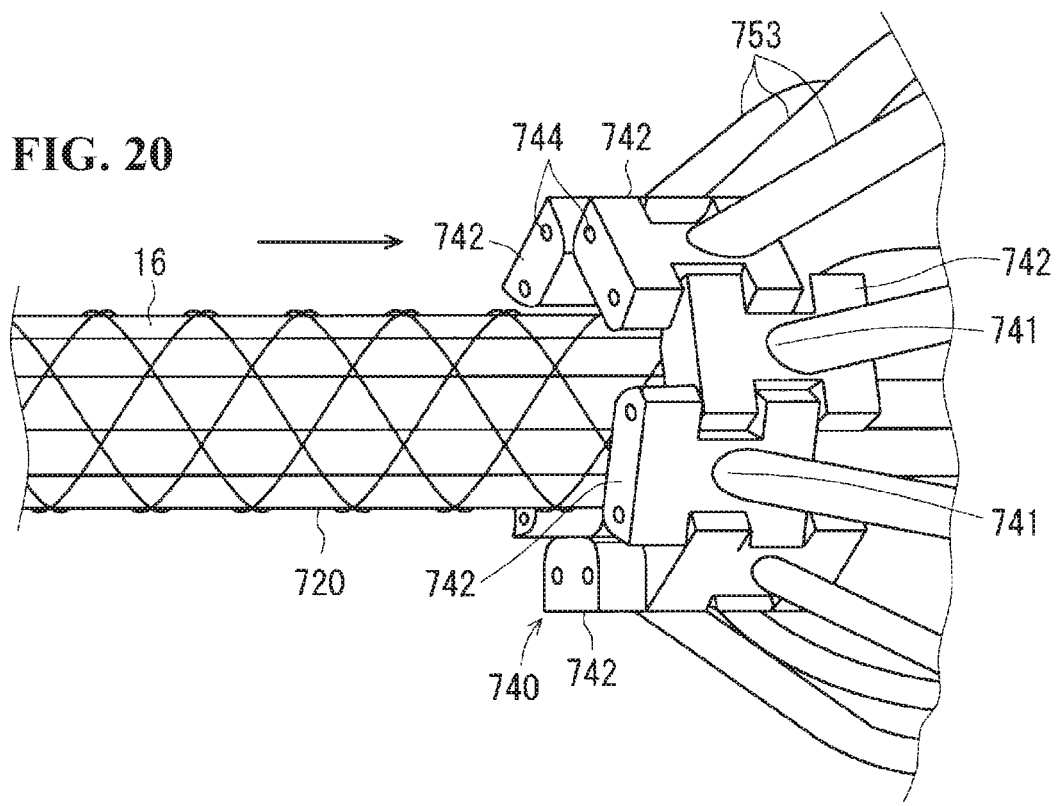
FIG. 20 is a schematic perspective view of a discharging portion according to a seventh modified example.
Figure 21:
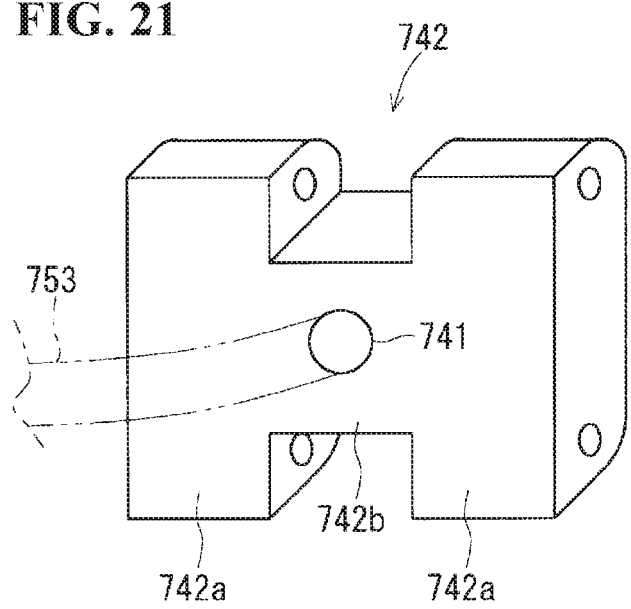
FIG. 21 is a schematic perspective view of a sub-discharging portion according to the seventh modified example.

In a seventh modified example shown in FIGS. 20 and 21, a discharging portion 740 is formed in an annular shape by using a plurality of sub-discharging portions 742 in combination.

Each of the sub-discharging portions 742 is an H-shaped member in which intermediate portions of a pair of rectangular parallelepiped portions 742*a* are joined together via a coupling portion 742*b*. The interval between the pair of rectangular parallelepiped portions 742*a* is set to be substantially the same as the width of the rectangular parallelepiped portion 742*a*, and an end of the rectangular parallelepiped portion 742*a* of another sub-discharging portion 742 can be provided between the pair of rectangular parallelepiped portions 742*a*.

The coupling portion 742*b* is provided with a nozzle 741. The nozzle 741 is open inside the coupling portion 742*b*, and is coupled to a tube 753 for supplying the fluid binding portion forming material on the outside of the coupling portion 742*b*.

An end of the rectangular parallelepiped portion 742*a* of one sub-discharging portion 742 is provided between the pair of rectangular parallelepiped portions 742*a* of another sub-discharging portion 742, and a coupling pin 744 is inserted into the end of the rectangular parallelepiped portion 742a of the one sub-discharging portion 742 and the ends of the pair of rectangular parallelepiped portions 742a of the other sub-discharging portion 742. As a result, the one sub-discharging portion 742 and the other sub-discharging portion 742 are rotatably coupled to each other. When a plurality of sub-discharging portions 742 are coupled in the same manner as described above such that the plurality of sub-discharging portions 742 are joined together in an annular shape, the discharging portion 740 in which the nozzles 741 are provided in an annular shape can be obtained. It should be noted that the nozzles 741 of the sub-discharging portions 742 adjacent to each other in the circumferential direction are shifted relative to each other in the extension direction of the bundle portion 16.

This discharging portion 740 is also moved in the extension direction of the bundle portion 16 while being swung and rotated around the bundle portion 16 in the same manner as in the above-described embodiment. Here, the nozzles 741 are extensively swung and rotated such that the meandering strips discharged from the nozzles 741 intersect and connect to each other. As a result, a mesh-like binding portion 720 can be formed.

Variations

It should be noted that the configurations described in the above-described embodiments and modified examples can be used in combination as appropriate as long as they are compatible with each other.

Having described the present invention in detail, the foregoing description is illustrative in all aspects and the present invention is not limited thereto. It is understood that countless variants not illustrated herein are conceivable without deviating from the scope of the present invention.

LIST OF REFERENCE NUMERALS 10, 110, 610 Electric wire bundle
12 Electric wire group
14 Electric wire
16 Bundle portion
20, 320, 420, 520, 620, 720 Binding portion
30, 130, 230, 330, 530 Apparatus for manufacturing electric wire bundle
32 Electric wire supporting portion
40, 540, 740 Discharging portion
41, 741 Nozzle
541a First nozzle
541b Second nozzle
50, 550 Movement mechanism portion
60, 560 Circumferential direction movement mechanism portion
70, 570, 670 Route direction movement mechanism portion
580 Condensing guide portion
590 Curing accelerating portion
592 Light emitting portion
672 X-direction movement mechanism portion
674 Y-direction movement mechanism portion
676 Z-direction movement mechanism portion

The invention claimed is:

1. An electric wire bundle comprising:
an electric wire group including a bundle portion in which at least a portion of a plurality of electric wires in an extension direction is bundled together; and
a binding portion formed by supplying a fluid binding portion forming material from a nozzle that is rotated relatively around an outer circumference of the bundle portion to an outer circumferential portion of the bundle portion in strip-shape in a form in which the bundle portion can be maintained in a bundled condition, by moving the nozzle with a movement mechanism around the outer circumference of the bundle portion, and curing the binding portion forming material,
wherein the binding portion is formed in a mesh shape.

2. The electric wire bundle according to claim 1,
wherein the binding portion has such rigidity that a route of the bundle portion can be maintained uniformly.

3. An apparatus for manufacturing an electric wire bundle including a bundle portion in which at least a portion of a plurality of electric wires in an extension direction is bundled together, the bundle portion being maintained in a bundled condition, the apparatus comprising:
an electric wire support configured to support the plurality of electric wires in a condition in which the bundle portion is raised;
at least one nozzle configured to discharge a fluid binding portion forming material; and
a movement mechanism configured to move the at least one nozzle such that the at least one nozzle is rotated relatively around an outer circumference of the bundle portion, and the fluid binding portion forming material discharged from the at least one nozzle is supplied to an outer circumferential portion of the bundle portion in strip-shape in a form in which the bundle portion can be maintained in a bundled condition.

4. The apparatus for manufacturing an electric wire bundle according to claim 3,
wherein the movement mechanism includes a circumferential direction movement mechanism configured to move the at least one nozzle such that the at least one nozzle is moved relatively around the bundle portion, and a route direction movement mechanism configured to move the at least one nozzle such that the at least one nozzle is moved relatively along a bundle portion formation route in the extension direction of the plurality of electric wires.

5. The apparatus for manufacturing an electric wire bundle according to claim 4,
wherein at least a portion of the bundle portion formation route is curved, and
the route direction movement mechanism moves the at least one nozzle such that the at least one nozzle is moved relatively while turning at at least one portion along the bundle portion formation route.

6. The apparatus for manufacturing an electric wire bundle according to claim 4,
wherein a condensing guide configured to condense the bundle portion to a more tightened condition is provided on a front side of the at least one nozzle in a direction in which the at least one nozzle is moved by the route direction movement mechanism.

7. The apparatus for manufacturing an electric wire bundle according to claim 4,
wherein a curing accelerator configured to accelerate curing of the fluid binding portion forming material is provided on a rear side of the at least one nozzle in a direction in which the at least one nozzle is moved by the route direction movement mechanism.

8. The apparatus for manufacturing an electric wire bundle according to claim 3,
wherein the at least one nozzle includes a plurality of nozzles provided at different positions in an extension direction of the bundle portion.

9. The apparatus for manufacturing an electric wire bundle according to claim 3,
wherein the at least one nozzle includes a plurality of nozzles provided at different positions around the bundle portion.

10. The apparatus for manufacturing an electric wire bundle according to claim 3,
wherein the at least one nozzle includes a plurality of first nozzles provided at different positions around the bundle portion, and a plurality of second nozzles provided at positions shifted relative to the plurality of first nozzles on a bundle portion formation route,
the movement mechanism includes a circumferential direction movement mechanism configured to move the plurality of first nozzles and the plurality of second nozzles together around the bundle portion, and a route direction movement mechanism configured to move the plurality of first nozzles and the plurality of second nozzles along the bundle portion formation route, and
the plurality of the first nozzles and the plurality of second nozzles are moved along the bundle portion formation route and moved periodically in both forward and reverse directions around the bundle portion such that the fluid binding portion forming material supplied from the plurality of first nozzles and the plurality of second nozzles form regular meandering strips in an extension direction of the bundle portion on an outer circumferential surface of the bundle portion and connect to one another on the outer circumferential surface of the bundle portion to form a mesh shape.

11. A method for manufacturing an electric wire bundle including a bundle portion in which at least a portion of a plurality of electric wires in an extension direction is bundled together, the bundle portion being maintained in a bundled condition, the method comprising:
    (a) preparing an electric wire group including a bundle portion in which at least a portion of a plurality of electric wires in an extension direction is bundled together;
    (b) supplying a fluid binding portion forming material from a nozzle that is rotated relatively around an outer circumference of the bundle portion to an outer circumferential portion of the bundle portion in strip-shape in a form in which the bundle portion can be maintained in a bundled condition, by moving the nozzle with a movement mechanism around the outer circumference of the bundle portion; and
    (c) curing the fluid binding portion forming material supplied to an outer circumferential surface of the bundle portion.

12. An apparatus for manufacturing an electric wire bundle including a bundle portion in which at least a portion of a plurality of electric wires in an extension direction is bundled together, the bundle portion being maintained in a bundled condition, the apparatus comprising:
    an electric wire support configured to support the plurality of electric wires in a condition in which the bundle portion is raised;
    at least one nozzle configured to discharge a fluid binding portion forming material; and
    a movement mechanism configured to move at least one of the electric wire support and the at least one nozzle such that the at least one nozzle is rotated relatively around an outer circumference of the bundle portion, and the fluid binding portion forming material discharged from the at least one nozzle is supplied to an outer circumferential portion of the bundle portion in strip-shape in a form in which the bundle portion can be maintained in a bundled condition;
    wherein the movement mechanism includes a circumferential direction movement mechanism configured to move at least one of the electric wire support and the at least one nozzle such that the at least one nozzle is moved relatively around the bundle portion, and a route direction movement mechanism configured to move at least one of the electric wire support and the at least one nozzle such that the at least one nozzle is moved relatively along a bundle portion formation route;
    wherein at least a portion of the bundle portion formation route is curved, and
    the route direction movement mechanism moves at least one of the electric wire support and the at least one nozzle such that the at least one nozzle is moved relatively while turning at at least one portion along the bundle portion formation route.

13. An apparatus for manufacturing an electric wire bundle including a bundle portion in which at least a portion of a plurality of electric wires in an extension direction is bundled together, the bundle portion being maintained in a bundled condition, the apparatus comprising:
    an electric wire support configured to support the plurality of electric wires in a condition in which the bundle portion is raised;
    at least one nozzle configured to discharge a fluid binding portion forming material; and
    a movement mechanism configured to move at least one of the electric wire support and the at least one nozzle such that the at least one nozzle is rotated relatively around an outer circumference of the bundle portion, and the fluid binding portion forming material discharged from the at least one nozzle is supplied to an outer circumferential portion of the bundle portion in strip-shape in a form in which the bundle portion can be maintained in a bundled condition;
    wherein the at least one nozzle includes a plurality of first nozzles provided at different positions around the bundle portion, and a plurality of second nozzles provided at positions shifted relative to the plurality of first nozzles on a bundle portion formation route,
    the movement mechanism includes a circumferential direction movement mechanism configured to move the plurality of first nozzles and the plurality of second nozzles together around the bundle portion, and a route direction movement mechanism configured to move the plurality of first nozzles and the plurality of second nozzles along the bundle portion formation route, and
    the plurality of the first nozzles and the plurality of second nozzles are moved along the bundle portion formation route and moved periodically in both forward and reverse directions around the bundle portion such that the fluid binding portion forming material supplied from the plurality of first nozzles and the plurality of second nozzles form regular meandering strips in an extension direction of the bundle portion on an outer circumferential surface of the bundle portion and connect to one another on the outer circumferential surface of the bundle portion to form a mesh shape.

* * * * *